Jan. 11, 1949.  E. A. EAKINS  2,458,694
METHOD OF MAKING SPONGE RUBBER MATERIAL
Filed Nov. 13, 1944
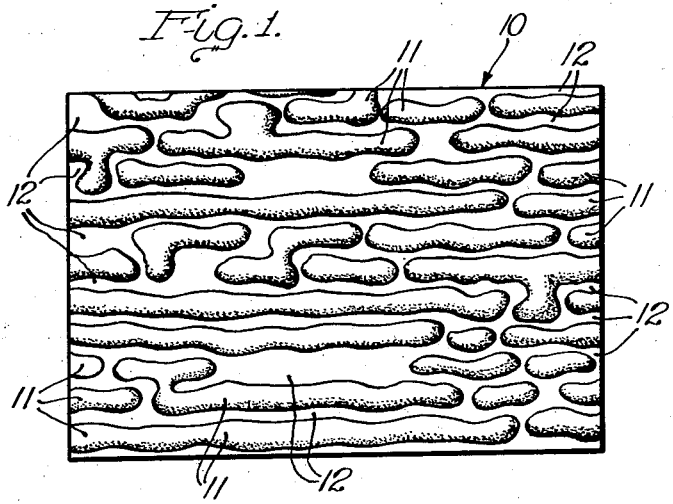
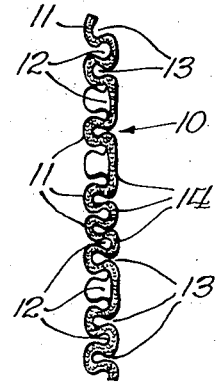
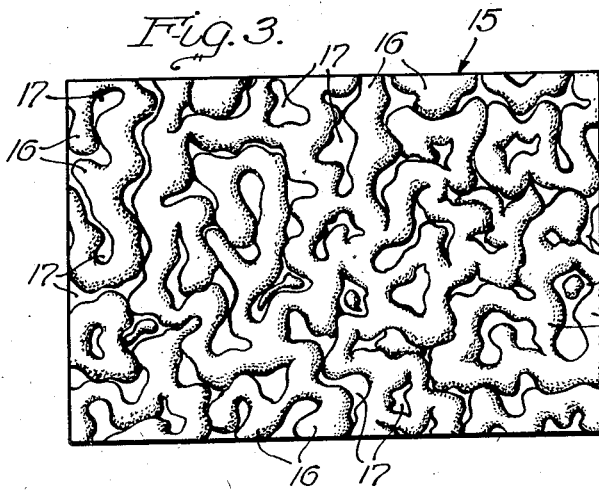
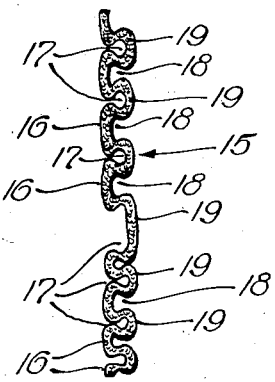
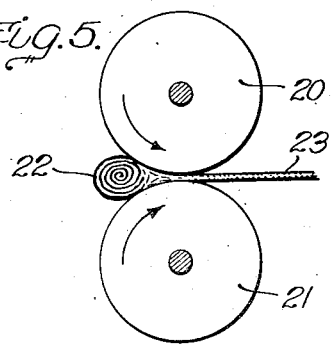
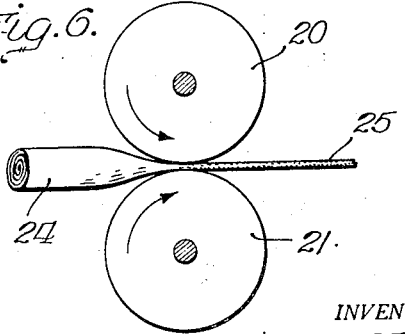
INVENTOR.
Everett A. Eakins
BY
Eugene M. Giles
Atty.

Patented Jan. 11, 1949

2,458,694

UNITED STATES PATENT OFFICE 2,458,694

METHOD OF MAKING SPONGE RUBBER MATERIAL

Everett A. Eakins, Mishawaka, Ind., assignor to Mishawaka Rubber and Woolen Manufacturing Company, Mishawaka, Ind., a corporation of Indiana Application November 13, 1944, Serial No. 563,150

8 Claims. (Cl. 18—53)

This invention relates to a method of making sheet sponge rubber material. In particular, it comprises a novel method of making sponge rubber material in sheet form, the surfaces of which are formed with more or less irregular or random wavy ridges or protuberances of the sponge rubber alternating with or associated with depressions or reentrant areas in the surface, so that the surfaces of the sheet material present somewhat the appearance of what is known as vermiculated work.

The principal object of the invention is to provide a simple, economical and expeditious mode of procedure for the production or manufacture of the novel sheet sponge rubber material hereof.

With this and other objects in view, the nature of which will be ascertained as the detailed description unfolds, the invention comprises the novel articles or materials, and methods of producing the same, hereinafter fully described, illustrated in the accompanying drawing and particularly pointed out in the appended claims, it being understood that the invention is not to be limited to the specific embodiments shown and described, but that many variations thereof may be made, within the scope of the claims, without departing from the spirit of the invention or sacrificing any of the advantages thereof.

In the drawing:

Fig. 1 is a plan view of a typical surface of sheet sponge rubber produced in accordance with the invention and wherein the ridges or corrugations, while wavy and more or less irregular, run in a somewhat generally parallel relationship.

Fig. 2 is a transverse cross-section of the material shown in Fig. 1.

Fig. 3 is a plan view of another typical surface, similar to Fig. 1, but wherein, due to a slightly different manipulation in the manufacture of the material, the ridges or corrugations meander or extend more in random fashion rather than in general parallelism.

Fig. 4 is a transverse cross-section of the material of Fig. 3.

Fig. 5 is a diagrammatic view illustrating the essential step in manufacture which produces the general type of configuration illustrated in Fig. 1.

Fig. 6 is a similar diagrammatic view illustrating the essential manipulation in manufacture which produces the general type of configuration seen in Fig. 3.

Heretofore what may be termed patterned surface, ribbed, corrugated or otherwise protuberant surfaced sponge rubber sheet material has been made by various molding or preshaping methods by which the ribs, corrugations, or the like are definitely and positively formed in the material according to a predetermined pattern. Thus, according to an early procedure, such material, which is particularly suitable as cushioning or skid resistant padding underneath rugs and carpet, has been produced by vulcanizing a suitable chemical or blowing rubber stock while confined in a mold. In such procedure, as is well known, the gas evolving constituent causes a sponging of the rubber and consequent expanding of the same so that the material completely fills the mold and assumes the shape or configuration of the mold walls.

A more recent development, set forth in the patent to G. W. Blair and V. H. Bodle, No. 2,325,903, eliminates some of the many disadvantages of the above set forth procedure. Thus, instead of requiring the confining of the material in expensive molding equipment, the patentees form incipient protuberances or ridges in the raw stock by sheeting the same through suitably grooved or engraved rolls, the incipient formations, during subsequent blowing and vulcanization while unconfined, blowing or expanding into relatively large and well defined formations of predetermined size and shape, and of uniform continuity.

Now the sponge rubber material of the present invention is of a similar type to that covered in the aforementioned Blair and Bodle patent, in that it is of a "free blown" nature. In other words the present material, like that of the said patent, is a sponge rubber sheeting and has surface protuberances, formations, ribs, or the like which are free blown in character, i. e., formed by blowing and vulcanization of the material while unconfined and without the employment of restrictive molding equipment. On the other hand, the present material differs markedly from that of said patent in that the formations, while presenting a certain over-all tendency toward uniformity, are not of definte and regular predetermined shape and extent but more or less meander as a result of a natural phenomenon employed in the manufacture of the material. Also, in the present material, the formations will be found to appear on both surfaces of the sheet. In this respect, where ribs, protuberances or other formations appear in relief on one surface of the material, corresponding depressions or valleys will be found upon the opposite surface, and vice versa. Moreover, no special equipment, such as the molds of earlier practices or the engraved rolls for preforming the material of said patent, are required for production of the present material, since there is utilized only a natural phenomenon occurring through a certain manner of manipulation while sheeting out the stock in ordinary calender or other plain rolls, as will hereinafter be explained.

The sponge rubber sheet material of the present invention is rather difficult to illustrate due to the fact, as above explained, that the formations are not completely uniform and do not follow any certain rigidly prescribed pattern. However, a sufficient indication of the nature of the product will be seen in Figs. 1 to 4, inclusive, of the drawing, which illustrate material having two general types of design which have been produced in accordance with the present invention. Thus, referring to Figs. 1 and 2, there is illustrated a plan view and a transverse sectional view, respectively, of a sample of the novel patterned sponge rubber sheeting of the present invention, of the type wherein ridges or formations, on both sides of the sheet, while somewhat irregular individually, still follow a general plan of longitudinal parallelism.

Referring to Figs. 1 and 2, in detail, the numeral 10 indicates generally a sample of the material of the present invention having the characteristics just mentioned. In the plan view of Fig. 1 the reference numeral 11 indicates elevated or protuberant ridges of the sponge rubber which, while somewhat wavy and irregular still follow a general plan of parallelism longitudinally of the sheet. Between the respective formations or ridges 11 are separating depressions or valleys 12.

Referring to Fig. 2 the protuberant ridges or formations 11 with the separating valleys 12 are readily seen at the left of the figure which is the surface seen in plan in Fig. 1. The opposite surface of this material, i. e., the surface not seen in Fig. 1 but appearing at the right hand side of Fig. 2, is quite similar to the illustrated surface in that valleys or indentations 13 appear opposite the ridges 11 while corresponding protuberances or formations 14 appear opposite the grooves or valleys 12. Thus, each of the sufaces of the material is substantially the converse of the opposite side.

Referring to Figs. 3 and 4, the numeral 15 indicates generally a sample of the material of the present invention but wherein the protuberant formations are more random, more irregular, and have more of a tendency to be interrupted than is the case of the type of Figs. 1 and 2. In this latter form there will be observed a number of meandering protuberances or formations 16, and, in many cases, these formations will be found to be interrupted, have curled ends, be joined together by short transverse protuberances, and any large area of the material will present a more or less labyrinthian effect. Between all of the protuberances 16 there are of course separating depressions 17. By reference to Fig. 4 it will also be appreciated, as in the case of the first described form, that the formations or protuberances 16 at one side of the material are matched by corresponding depressions or grooves 18 at the opposite side, while the depressions 17 produce the corresponding formations 19 on the opposite surface.

Thus, it will be appreciated that the novel sponge rubber sheet material of the present invention comprises blown sponge rubber sheeting which has on each surface of the same various types of random or irregular protuberances, ridges or relief formations with separating depressions, each surface being a substantial converse of the other in that the protuberances on one surface are matched by depressions on the other and vice versa.

The methods of producing this material, to be presently explained, are of the utmost simplicity and economy and the material itself is a most adaptable product, being particularly suitable as cushioning or slip preventing padding underneath carpets and rugs and may be advantageously employed as wash cloths, towels, desk pads, doilies, saddle pads and, in fact, in most any environment where a soft, cushioning, non-slip surface is desired.

The production of the above described material, in accordance with the present invention, employs the objectionable phenomenon, sometimes encountered in sheet sponge rubber manufacture, known as "cold checks" or "fish tails." Thus, in the manufacture of sheet sponge, in order to obtain an unblemished surface, it is necessary to calender or sheet out the stock at a certain optimum temperature, which may vary for any particular compound. That is to say, the calender or sheeting rolls must be maintained at a temperature high enough so that the rubber stock acquires sufficient flow or plasticity to form into a smooth sheet, but not so high that the stock becomes too fluid or that will start incipient or premature vulcanization or evolution of the sponging gas. The optimum temperature range for each particular compound is determined empirically and, once established, may remain standard for that compound. Thus, so long as the temperature of the sheeting rolls remains above the minimum but below the maximum established for the compound, that compound will sheet out into a smooth sheet free of surface defects or blemishes.

However, it has been observed that, should the roll temperatures momentarily drop below the required minimum, or should areas of the rolls become cooler than the minimum, then there result in the sheeted stock local blemishes or imperfections referred to in the rubber industry as "cold check" or "fish tails." In the uncured stock these cold checks are minute and only observable by close inspection. But, upon blowing and vulcanization of the stock, they enlarge and expand into very undesirable protuberances or cavities which mar the desired smooth surface and, in fact, completely ruin the material. In instances where the stock is cured under conditions of confinement, such as in a mold or closed platen press, the confining surfaces may sometimes smooth out and thus eliminate any cold checks, particularly if they are relatively inconsequential. Nevertheless, the industry has always attempted to eliminate the occurrence of cold checks, by maintaining the sheeting out temperatures within the prescribed ranges, because they are always a source of trouble and may result in the necessity of scrapping the material.

It is thought that cold checks may be due to a wrinkling of the rubber surface or the pulling, kneading or pinching of very small areas of the rubber over the adjacent surface with the formation of minute pockets containing entrapped air which causes differential expansion or a rupture to form the undesirable blemishes in the cured product. It is to be remembered that past experience with this phenomenon has been confined to its occurrence only sporadically and at isolated areas of the sheeted stock, and solely as a condition to be avoided.

Now I have discovered, as a prime feature of the present invention, that there can be produced, generally speaking, an attractive and useful pattern surfaced sponge rubber sheeting having the characteristics and advantages heretofore described by employing or taking advantage of the cold check or fish tail phenomenon. To this end the desired result may be achieved, in general, by sheeting out the blowing rubber stock while maintaining the temperature of the sheeting rolls at a point somewhat below the established and prescribed temperature for producing a smooth surfaced sheet. This practice, I have found, produces cold checks fairly uniformly throughout the entire sheeted stock. Upon rapid curing of the material at high temperatures while unconfined the stock blows or sponges and expands differentially, due to the cold checks throughout its area, into the cured product with protuberant ridges and alternate valleys on each surface, such as has been hereinbefore described and samples of which are illustrated in Figs. 1 to 4 of the drawing.

In the practice of the present invention I prefer to employ a chemical blowing rubber stock which is so compounded as to be capable of a relatively high degree of expansion during sponging and vulcanization so that the resulting protuberances or ridges will be of ample size or volume and well defined. Moreover, it is advantageous that the stock be fast curing so that it expands and sponges rapidly in order that the pattern or protuberances may form and set up quickly without tending to collapse or flow together. A suitable compound having these properties is one that is capable of about a 10 to 1 or even 12 to 1 ratio of expansion and which will blow and cure in about five to ten minutes at temperatures from say 320° to 330° F. These conditions can, of course, be varied widely depending upon the preference of the operator and the characteristics desired in the finished product. Generally speaking, lesser ratios of expansion and longer curing cycles will produce lower and less well defined ridges or protuberances.

For the purpose of a complete understanding of the invention, I have set forth below a typical formula for a rubber compound having the properties above mentioned and will indicate a specific manner of handling and processing this compound to produce the novel pattern surfaced sheet sponge rubber of the present invention, it being understood, of course, that the compound and processing details may be varied widely as above explained and to be further indicated.

This typical compound is as follows, proportions given being parts by weight:

| | |
|---|---|
| Pale crepe | 100.0 |
| Zinc oxide | 4.2 |
| Laurex | 3.8 |
| Paraffin oil | 12.0 |
| Whiting | 4.5 |
| AXEL (accelerator) | 1.0 |
| No. 8 accelerator | 1.0 |
| Zenite A | 0.5 |
| Sodium bicarbonate | 7.5 |
| Sulphur | 3.3 |
| Retarder W | 0.5 |
| Acetic acid | 0.5 |

The preferable manner of mixing the above compound consists in first milling the rubber or pale crepe, after which the Laurex is added. As the latter is milled in all the other ingredients, except the paraffin oil, are added and milled in. The paraffin oil is added last. The material is then slabbed off the mixing mill in thicknesses of approximately one-half inch and allowed to cool. After cooling about six cc. of 56% acetic acid are added to the compound and the same is then ready for the calendering or sheeting out operation under conditions which produce the uniform occurrence of cold checks, as hereinbefore explained.

The compounded stock is first preferably passed a few times through pre-heating rolls to bring it up to a temperature where it has sufficient plasticity to be calendered into a sheet of uniform thickness. It is then introduced into the calender rolls which are maintained at a temperature just somewhat below that which has been determined to be the minimum for forming a smooth unblemished sheet of this particular compound. Thus, for forming a smooth sheet of this stock the calender rolls must be maintained at temperatures above about 220° F. In the practice of the present invention, I have found that cold checks will be formed rather uniformly throughout the resulting sheet of this particular compound if the temperature of the calender rolls be maintained somewhere in the region of 170° F. In other words the cold checks are formed satisfactorily at any temperature below the prescribed minimum for smooth sheet formation so long as enough heat is present to retain the stock sufficiently plastic to be formed into a sheet of uniform gauge.

Proceeding as just described, the calendered sheet, having a thickness of about 20 to 25 gauge although the thickness may be readily varied depending upon the setting of the adjustable calender rolls, will be seen, upon close inspection, to be very faintly mottled or to have an almost imperceptible design of the general appearance of a herringbone pattern. The cold checks throughout the entire surface of the sheet, which are responsible for this appearance, can be made even more pronounced by operating the calender with one roll revolving at a slightly different speed than the other, such condition effecting a more positive kneading or crimping action on the rubber stock and creating in the subsequent blow, larger and more sharply defined ridges and valleys.

The sheeted stock, having the cold check or fish tail effect produced throughout its surfaces, is now subjected to vulcanization temperatures to sponge and expand the material into its permanent pattern surfaced condition. To this end the material may be placed in a vulcanizing oven or chamber, or passed in continuous lengths through an elongated vulcanizing chamber and subjected to the correct degree of heat for a proper time period, as required by the particular compound, to effect complete sponging, expansion and vulcanization. As regards the particular compound whose formula is given above, the curing conditions comprise subjection to a temperature of about 330° F. for a period of from five to eight minutes. During this treatment gas is evolved and the material sponges and expands to about ten times its calendered volume, with the formation of ridges and valleys, as illustrated in Figs. 1 to 4 of the drawing, due to the overall cold checking of the surfaces of the stock. Vulcanization of the rubber is also effected so that the material permanently assumes the condition and characteristics illustrated in said figures. As previously explained, the material must be cured while unconfined so that expansion and formation of the protuberances can proceed without hindrance. Thus a non-confining oven, chamber or tunnel is preferred for the vulcanizing treatment, although even a platen press may be employed if the platens are set far enough apart so that the material can freely expand to its maximum extent. The sheeted stock should, of course, be supported in flat condition during the cure. To this end suitable lengths may be accommodated in shallow pans or on screens, the latter permitting a more uniform penetration of heat. In continuous operation it will generally be preferable to lay the stock on a belt conveyor traveling through an elongated vulcanizing chamber at a speed which will subject the material to the required heat for the necessary length of time. Under the conditions delineated and employing the illustrative compound, the material, calendered to a thickness of approximately 20 to 25 gauge, will, upon curing, form a sheet of about one-quarter inch overall thickness and having the surface configuration and appearance heretofore described.

While I have successfully employed the above compound and processed the same under the specific conditions given, in the practice of the invention, I have also successfully utilized other compounds and other conditions of treatment specifically suitable for the same. So far as I am aware, all chemical blowing sponge rubber compounds are susceptible to the occurrence of cold checks when the temperature of the sheeting out rolls is below the minimum required for the formation of a smooth unblemished sheet, and it is to be understood that any such compounds and appropriate easily determined conditions of treatment are employable in the practice of the present invention.

Certain control measures and manipulative factors may be employed to vary the general characteristics of the pattern or design produced in the practice of the invention. Thus, as was previously mentioned, varying the speed of one calender roll relative to the other tends to have some effect upon the size and sharpness of the ultimately produced protuberances and/or depressions. Likewise varying the temperature of the rolls, below the minimum for smooth sheet production of course, causes some variation in the appearance of the pattern.

Positive manipulations, however, are responsible for the reproduction of the two general and distinct types of patterning shown in Figs. 1, 2 and 3, 4, respectively, of the drawing. These procedures are illustrated, more or less diagrammatically, in Figs. 5 and 6 of the drawing.

In the milling of rubber it is a general practice for the operator to form the soft stock into a roll or cylinder, approximately the length of the rolls, as it comes off the mixing mill or pre-heating rolls, if it is to be subsequently calendered or sheeted out.

In the practice of the present invention, if the stock is formed into a roll or cylinder at the milling or pre-heating rolls, as just described, and is then inserted into the bight of the calender or sheeting rolls with its axis paralleling that of the rolls, and sheeted out so as to produce the cold checks as heretofore described, then the resulting ridges in the cured product will follow a general tendency toward parallelism as shown in Fig. 1 of the drawing. On the other hand, if the roll of stock is introduced endwise into the calender rolls, i. e., with its axis at right angles to that of the rolls, then the resulting ultimate design will be more random and meandering, substantially as illustrated in Fig. 3.

To be more explicit, reference is made to Figs. 5 and 6 of the drawings. Fig. 5 illustrates the manipulation first above mentioned. Therein the reference characters 20 and 21 designate the respective rolls of a calender, the rolls revolving in the direction indicated by the arrows. The numeral 22 designates a roll or cylinder of blowing rubber stock, formed at the mixing or preheating rolls as previously described, and the roll of stock is shown being taken into the calender rolls with its axis parallel to that of the rolls, and being formed or sheeted out into the flat sheet 23. It is understood that the temperature of the rolls 20 and 21 is maintained in a range to produce the cold checks throughout the sheet 23 in the manner heretofore described. Upon vulcanization of the sheet 23 there will result a sponge rubber sheet with wavy ridges and depressions on each surface but following a general tendency toward parallelism lengthwise of the sheet, in the manner illustrated in Fig. 1.

In Fig. 6 the same or similar calender rolls 20 and 21 are seen but, in this instance, the roll or cylinder of stock 24 is being passed into the bight of the rolls lengthwise with its axis at right angles to that of the rolls and is being formed into a sheet 25 provided with the cold checks. As a result of this manipulation the sheet 25, when cured, will form a sponge rubber sheet having the more random and meandering ridges, protuberances and valleys characteristic of the sample of Fig. 3. Introduction of the stock roll to the calender at various angles between that of Fig. 5 and of Fig. 6 may still further modify the general appearance of the resulting product.

The reasons for or causes of these phenomena are not well understood. It may be that the so-called grain of the rubber has something to do with the type of cold checks which are produced. Or possibly the wide spreading of the stock occasioned by lengthwise insertion into the rolls alters the direction or form taken by the cold checks. Whatever the theory, suffice it to say that these manipulations respectively result in the general characteristics exhibited in the samples of Figs. 1 and 3 respectively.

It is also possible, during the calendering or sheeting out operation, to pass a fabric, preferably of an open woven type such as burlap, osnaburg, or the like, through the rolls in contact with one face of the rubber stock. Due to the pressure of the rolls the stock will be forced into the interstices of the fabric and will be subsequently permanently united to the fabric by vulcanization. In the resulting product the fabric acts not only as a strengthening medium but also prevents or retards stretching of the sponge rubber and helps to maintain any area of the material at a desired size. This effect is particularly helpful where the material is to be used as underpadding for rugs and is required to have and maintain an area substantially the same as that of the rug.

Various modifications of the specific procedures above described are possible, of course, within the scope of the claims. For instance, it may not be necessary or desirable to employ preheating rolls since, in many instances, the roll of sponge stock can be taken to the sheeting out step direct from the mixing mill, or even sheeted out in the mixing rolls, for that matter. In this connection it is understood that the essential step is the deliberate production of cold checks or fish tails throughout the area of blowing rubber stock and the subsequent expansion of the same into relief designs which may vary widely depending upon the specific conditions of procedure. In fact, the product hereof may, perhaps, be conveniently described as having a crinkled surface resulting from initially producing a sheet of stock having inherent crinkle forming characteristics throughout its area, and then blowing and expanding the material and thereby activating the crinkle forming characteristics to produce the typical crinkled surface as described.

From the foregoing it will be understood that no mold, form or other shaping means is employed to produce the formations of this invention, but they are free blown, and that the shape, size and relative arrangement thereof is determined by the inherent characteristics of the sheet itself, these said characteristics being effective in the blowing operation to impose a puckering effect and cause localized outpuffings or puckers of self assumed random shapes, sizes and relative arrangement throughout the area of the sheet.

The terms "puckering" and "puckers" are used herein to mean respectively the producing of generally elongated fold like formations and the generally elongated fold like formations produced by restrictive conditions present in the material itself which cause an outpuffing of certain areas of the material into the formation shapes as distinguished from the producing of such formations and formations produced with molds, forms or the like, and "puckered" is used herein with corresponding meaning. The terms "free blowing" and "free blown" are used herein to mean the blowing or expanding of the compound into formation shapes in the absence of any molds, forms or the like to regulate or determine the size, shape or location of the formations.

While I have shown and described my invention in preferred forms, I am aware that various change and modifications may be made therein without departing from the principles of the invention, the scope of which is to be limited only by the appended claims.

What is claimed is:

1. The method of making sponge rubber sheet material having surface protuberances which comprises, sheeting out blowing rubber stock while maintaining the temperature of the same below that which will produce a smooth surfaced sheet, whereby cold checks are formed on a surface of the material, and blowing and vulcanizing the material while unconfined whereby freely expanded protuberances are formed as a result of the cold checks.

2. The method of making sponge rubber sheet material having surface protuberances which comprises, calendering blowing rubber stock into sheet form while maintaining the temperature of the calender rolls below that which will produce a smooth surfaced sheet, whereby cold checks are formed on a surface of the material, and blowing and vulcanizing the material while unconfined whereby freely expanded protuberances are formed as a result of the cold checks.

3. The method of making sponge rubber sheet material having surface protuberances which comprises, calendering blowing rubber stock into sheet form while maintaining the temperature of the calender rolls below that which will produce a smooth surfaced sheet and while operating the respective rolls at different speeds, whereby cold checks are formed on a surface of the material, and blowing and vulcanizing the material while unconfined whereby freely expanded protuberances are formed as a result of the cold checks.

4. The method of making sponge rubber sheet material having surface protuberances which comprises, compounding a blowing rubber stock which has a relatively high ratio of expansion and is rapidly vulcanizable at relatively high temperatures, sheeting out said stock while maintaining the temperature of the same below that which will produce a smooth surfaced sheet, whereby cold checks are formed on a surface of the material, and blowing and vulcanizing the material in a short period of time at a relatively high temperature while unconfined whereby freely expanded protuberances are formed as a result of the cold checks.

5. The method of making sponge rubber sheet material having surface protuberances which comprises, forming blowing rubber stock into a cylindrical roll, introducing said roll of stock into a calender and therein sheeting out the stock while maintaining the temperature of the calender rolls below that which will produce a smooth surface sheet, whereby cold checks are formed on a surface of the material, and blowing and vulcanizing the material while unconfined whereby freely expanded protuberances are formed as a result of the cold checks.

6. The method of making sponge rubber sheet material having surface protuberances which comprises, forming blowing rubber stock into a cylindrical roll, introducing said roll of stock into a calender with its axis paralleling that of the calender rolls and therein sheeting out the stock while maintaining the temperature of the calender rolls below that which will produce a smooth surfaced sheet, whereby cold checks are formed in a surface of the material, and blowing and vulcanizing the material while unconfined whereby freely expanded protuberances are formed as a result of the cold checks.

7. The method of making sponge rubber sheet material having surface protuberances which comprises, forming blowing rubber stock into a cylindrical roll, introducing said roll of stock into a calender with its axis at right angles to that of the calender rolls and therein sheeting out the stock while maintaining the temperature of the calender rolls below that which will produce a smooth surfaced sheet, whereby cold checks are formed on a surface of the material, and blowing and vulcanizing the material while unconfined whereby freely expanded protuberances are formed as a result of the cold checks.

8. The method of making sponge rubber sheet material having surface protuberances which comprises, forming blowing rubber stock into a cylindrical roll, introducing said roll of stock into a calender with its axis at an angle to that of the calender rolls and therein sheeting out the stock while maintaining the temperature of the calender rolls below that which will produce a smooth surfaced sheet, whereby cold checks are formed on a surface of the material, and blowing and vulcanizing the material while unconfined whereby freely expanded protuberances are formed as a result of the cold checks.

EVERETT A. EAKINS.

REFERENCES CITED

The following references are of record in the file of this patent:

UNITED STATES PATENTS

| Number | Name | Date |
| --- | --- | --- |
| 2,325,903 | Blair et al. | Aug. 3, 1943 |